(12) United States Patent
Yako et al.

(10) Patent No.: US 7,409,588 B2
(45) Date of Patent: Aug. 5, 2008

(54) METHOD AND SYSTEM FOR DATA PROCESSING WITH HIGH AVAILABILITY

(75) Inventors: Katsushi Yako, Yokohama (JP); Norihiro Hara, Kawasaki (JP); Tooru Kawashima, Yokohama (JP); Masami Hikawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 11/138,385

(22) Filed: May 27, 2005

(65) Prior Publication Data
US 2005/0267904 A1 Dec. 1, 2005

(30) Foreign Application Priority Data
May 28, 2004 (JP) ............... 2004-158628

(51) Int. Cl.
*G06F 11/00* (2006.01)
(52) U.S. Cl. ............................. 714/15; 714/1
(58) Field of Classification Search .................. 714/15, 714/1, 11–13; 707/100, 200, 202, 204
See application file for complete search history.

(56) References Cited

U.S. PATENT DOCUMENTS

| | | | | |
|---|---|---|---|---|
| 5,553,303 | A * | 9/1996 | Hayashi et al. ................. | 707/2 |
| 5,625,811 | A * | 4/1997 | Bhide et al. ..................... | 707/2 |
| 5,675,791 | A * | 10/1997 | Bhide et al. ................... | 707/205 |
| 5,987,432 | A * | 11/1999 | Zusman et al. ................ | 705/35 |
| 6,947,957 | B1 * | 9/2005 | Lange ........................ | 707/200 |
| 7,024,414 | B2 * | 4/2006 | Sah et al. ..................... | 707/101 |
| 7,039,827 | B2 * | 5/2006 | Meyer et al. .................... | 714/4 |
| 7,231,391 | B2 * | 6/2007 | Aronoff et al. ................. | 707/8 |
| 2002/0129146 | A1 * | 9/2002 | Aronoff et al. .............. | 709/225 |
| 2003/0126240 | A1 * | 7/2003 | Vosseler ...................... | 709/221 |

FOREIGN PATENT DOCUMENTS

WO 03003252 1/2003

OTHER PUBLICATIONS

Implementing IBM® DB2® Universal Database™ V8.1 Enterprise Server Edition with Microsoft® Cluster Server, Jan. 2003. A. Nomani, pp. 1-55.
Parallel Database Systems: The Future of High Performance Database Systems, Communication of the AGM/Jun. 1992/vol. 35, No. 6, pp. 85-98.
"Transaction Processing, Concepts and Techniques", by Jim Gray and Andreas Reuter, Morgan Kaufmann Publishers, 1993.

* cited by examiner

*Primary Examiner*—Dieu-Minh Le
(74) *Attorney, Agent, or Firm*—Mattingly, Stanger, Malur & Brundidge, P.C.

(57) ABSTRACT

A server to be changed is added to a destination unit in terms of configuration. The server to be changed is started to restore the database in the database storage region to which the server has access and to restore the transaction for the process that was executed when the server failed. The destination of the failed server (a system destination unit) when failure occurs is determined to stabilize the throughput of the entire system after the switchover of the system in the event of failure. The destination server is determined according to an instruction given in advance by the user. The database management system statistically determines the destination server in accordance with a policy designated by the user. Alternatively, the database management system dynamically determines the destination server according to the policy designated by the user when failure occurs.

15 Claims, 9 Drawing Sheets

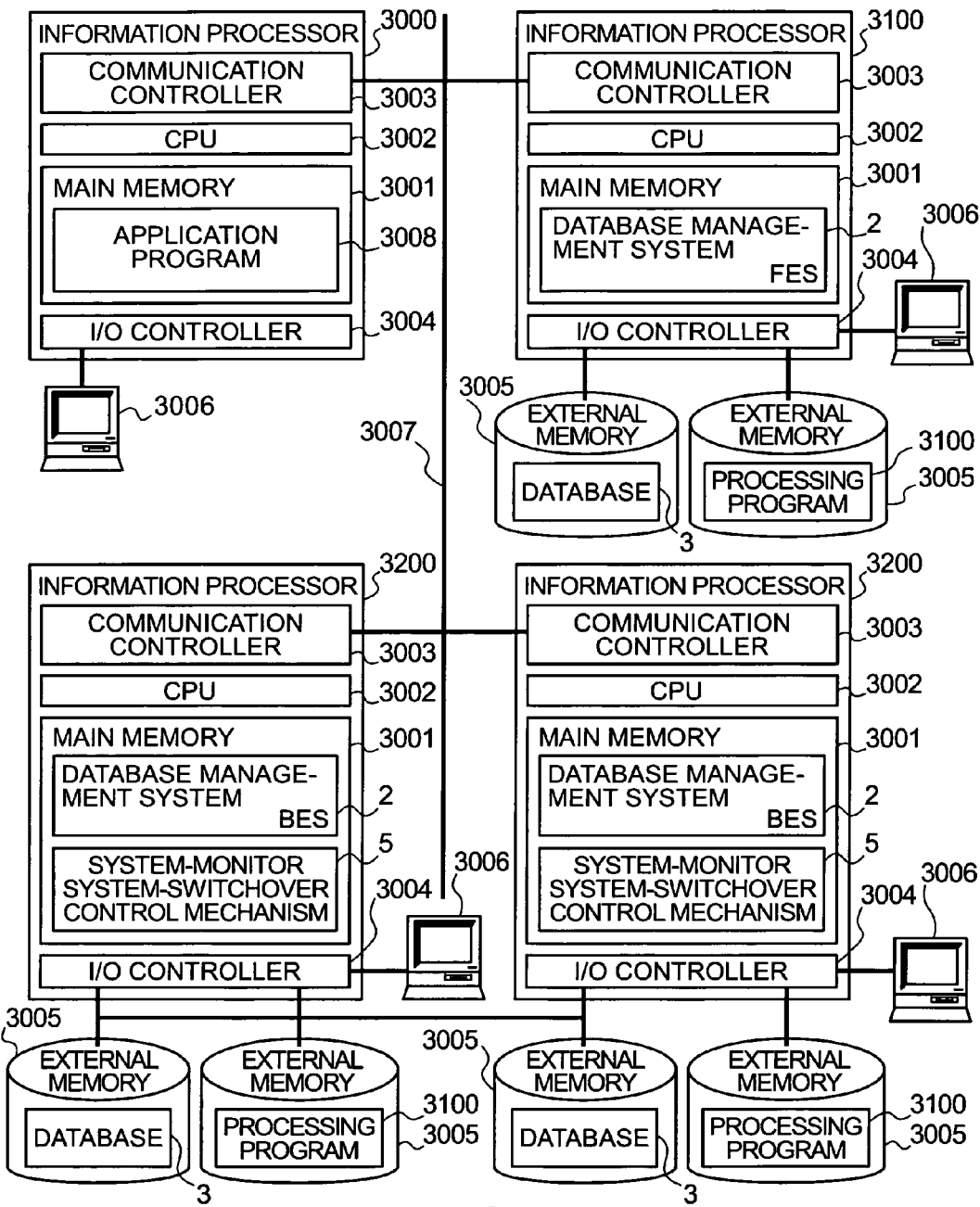

FIG.5

| | |
|---|---|
| BES1 | unit1 |
| BES2 | unit1 |
| BES3 | unit3 |
| BES4 | unit3 |
| BES5 | unit2 |

| | |
|---|---|
| BES1 | *unit2* |
| BES2 | *unit2* |
| BES3 | *unit2* |
| BES4 | unit1 |
| BES5 | unit3 |

601 602
611
612
613
614
615

⇩ unit2 FAILURE HAS OCCURRED

| | |
|---|---|
| BES1 | *unit1* |
| BES2 | *unit1* |
| BES3 | *unit3* |
| BES4 | unit1 |
| BES5 | unit3 |

601 602
621
622
623
624
625

METHOD AND SYSTEM FOR DATA PROCESSING WITH HIGH AVAILABILITY

BACKGROUND OF THE INVENTION

1. Field of the Invention

The present invention relates to a technique for data processing, and in particular, it relates to a technique suitable for a database management system (DBMS) having a system switchover function.

2. Description of the Related Art

Network business in which the stop of service causes a serious loss in business opportunities requires a reliable system that works for 24 hours all the year around. Particularly, it is important to localize the influence of failure and to restore the system rapidly. Related-art database management systems (DBMS) have used "a technique of system switchover" in which a standby machine separate from a service executive machine is prepared, to which the execution of the service is switched when failure occurs in order to restore the system rapidly in the event of failure.

For example, a technique for a hot standby nonstop operation and high availability (HA) adopted as remedies for DBMS failure with such a system configuration is disclosed in "Transaction Processing, Concepts and Techniques", by Jim Gray and Andreas Reuter, Morgan Kaufmann Publishers, 1993.

Also, a technique for architecture in which the load of database processing is shared by multiple processors, where the process is executed in parallel, is disclosed in "Parallel Database Systems, the Future of High Performance Database Systems", Communications of the ACM, Vol. 35, No. 6, 1992, pp. 85-98. The shared-everything shared-disk architecture disclosed in the related art allows all the computers that execute DB processing to access all data, while a shared-nothing architecture allows access only to data stored in disks connected to its own computers.

A shared-nothing architecture has less shared resources among the constituent units that execute DB processing than a shared-everything architecture and so has excellent scalability. Also the shared-nothing architecture often uses the technique of system switchover to provide high availability.

A technique of system switchover in which a DB storage region is used as the unit of switchover in a database management system including multiple DB storage regions in each machine (for example, a load-sharing system-switchover method) is disclosed in "Implementing IBM DB2 Universal Database V8.1 Enterprise Server Edition with Microsoft Cluster Server", by Aslam Nomani, International Business Machines Corporation, FIG. 16, pp. 40-41, 2003 (searched online on Dec. 19, 2003). <http://www-306.ibm.com/software/data/pubs/papers/esemcs/esemcs.pdf> In this technique, an execution system and a standby system are defined for each DB storage region, wherein, in normal state, the execution system accesses a corresponding DB storage region, while in failure, the standby system accesses a corresponding DB storage region, to continue the service. In this method, a standby system is defined such that multiple DB storage regions of an identical machine are distributed to difference machines. When failure has occurred in one machine, multiple DB storage regions of the machine are taken over to different machines. Thus, the process execution load after system switchover is shared by multiple machines, thereby reducing a decrease in throughput of the entire system.

The system switchover method has to prepare a standby machine different from an execution machine, and the standby machine is out of use when a normal service is executed. Also, in the system switchover method, the execution of a normal service can be assigned also to the standby machine in the form of cross standby. However, in order to restore the system rapidly in the event of switchover, the system in the standby machine is often started halfway (warm standby or hot standby), so that the resource (processes and memories) of the standby system must be prepared too much.

The system that requires a standby-only resource which is inoperative in normal state does not make effective use of the resource in normal state, having a problem in terms of reduction in total cost of ownership (TCO) in system construction and operation. Also, when failure occurs in a given operating machine and the failure is taken over to another operating machine by system switchover, process load is concentrated to the destination machine (the load can be twice as high as that of normal state), decreasing the throughput of the entire system.

SUMMARY OF THE INVENTION

Accordingly, it is an object of the invention to reduce a standby-only resource which is inoperative in normal state. It is another object of the invention to prevent the decrease in throughput of the entire system and to suppress the unbalance in load after system switchover in the event of failure.

In order to achieve the objects, the invention makes DB processing in failed unit switch to an operating unit in a database management system that uses a shared-nothing architecture. The invention also provides a method that switches multiple servers (logic components that provide a DB access function in the database management system) contained in the failed unit to multiple operating units. The unit has the function of adding a server being changed to a destination unit and the function of starting the server being changed, restoring the database of the database storage region to which the server has access, and restoring the transaction for the process that was executed when the server failed. The invention further provides a method of determining destinations of servers (system-switchover destination unit) when failure occurs in order to stabilize the throughput of the entire system after the switchover of the system in the event of failure, the method including the function of determining a destination server according to the instruction of the user, the function that the database management system statistically determines a destination server according to a policy designated by the user, or the function that the database management system dynamically determines a destination server according to a policy designated by the user when failure occurs.

According to embodiments of the invention, a standby-only resource can be reduced.

BRIEF DESCRIPTION OF THE DRAWINGS

FIG. 3 is a diagram showing an example of the hardware configuration of a computer system;

FIG. 4 is a diagram showing an example of server-database storage region information;

FIG. 5 is a diagram showing an example of server destination information when failure occurs;

FIG. 6 is a diagram showing an example of server-unit configuration information;

DESCRIPTION OF THE PREFERRED EMBODIMENTS

The present invention is described in detail below based on embodiments, with reference to the attached drawings.

The concept of the invention will briefly be described with reference to FIG. 1.

A database management system according to an embodiment of the invention includes a process-request reception server (a front end server: FES) 10 and a DB access server (a back end server: BES) 20. The DB access server is also referred to as a DB process server. The server in this case is a logical functional component in the database management system but is not a physical machine, or an information processor. The various servers in the embodiment are achieved by programs, objects, processes, and threads.

The process-request reception server (FES) 10 receives and analyzes an inquiry 70 from a user, generates a DB access request to a DB access server 80, and returns the result of the DB access to the user as necessary. The DB access server (BES) 20 receives the DB access request from the FES 10, manipulates data on a DB storage region in response to the request, and returns the result to the process-request reception server 10 as necessary. The FES 10 and the BES 20 are achieved by one or more processes or threads.

The architecture of the database management system of this embodiment is a shared-nothing architecture, in which a database (e.g., a table and an index) managed by this system is segmented into multiple segmented tables and segmented indices by various methods and stored in multiple DB storage regions. A given DB storage region is associated with a given DB access server. The DB access server has access only to data (e.g., table data and index data) in a DB storage region associated with the DB access server.

Figure 1:
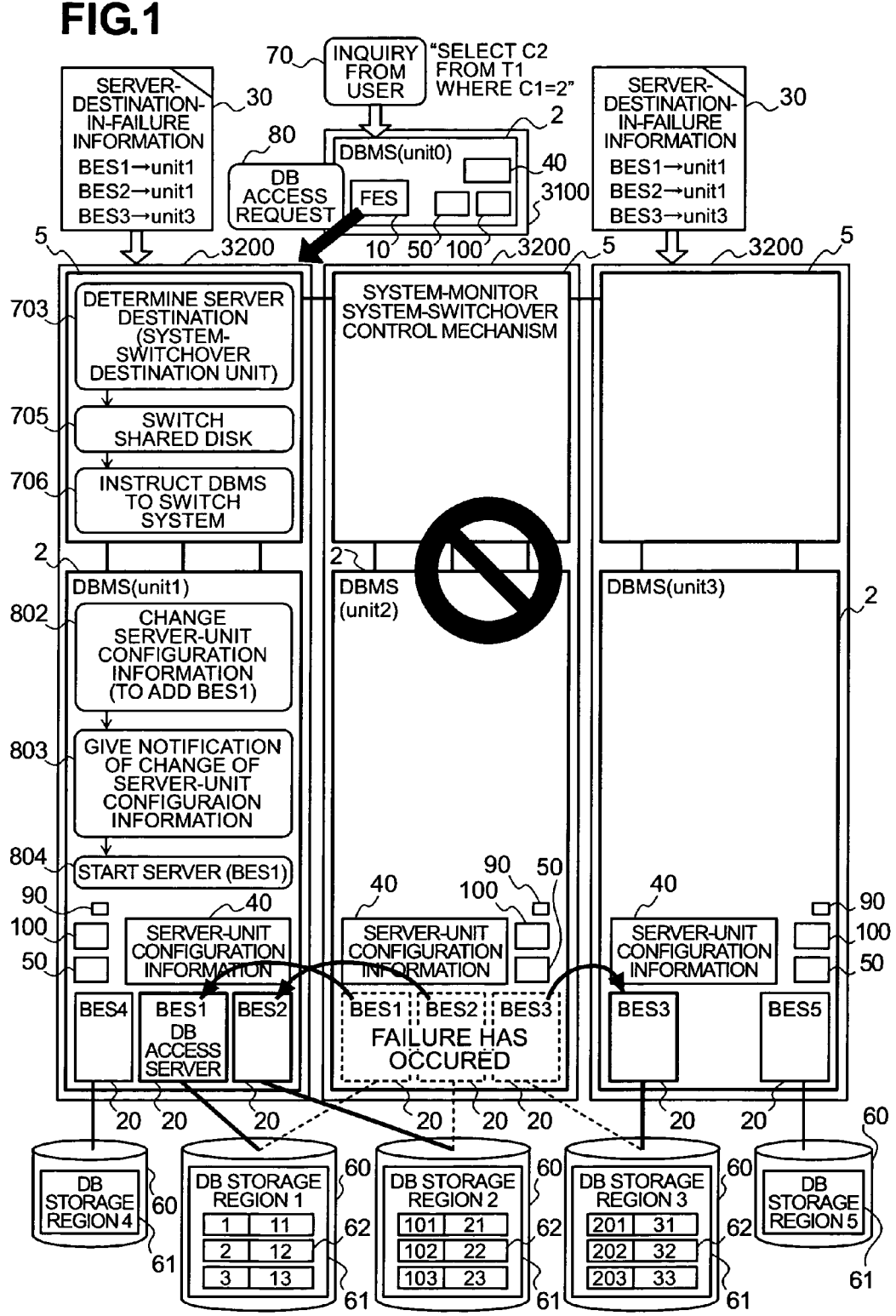
FIG. 1 is a conceptual diagram of a database management system according to an embodiment of the present invention.

In the example of FIG. 1, BESX 1 processes only an access request to a DB storage region 1, while BESX 2 processes only an access request to a DB storage region 2. Similarly, BESX 3 processes only an access request to a DB storage region 3, BESX 4 processes only an access request to a DB storage region 4, and BESX 5 processes only an access request to a DB storage region 5. The BES 1, the BES 2, the BES 3, the BES 4, and the BES 5 do not access the same database storage region. Which of the BESs processes an access request to a given database storage region is determined statically by a server-DB storage-region information 50, to be described later, in the system.

The BES 1, the BES 2, the BES 3, the BES 4, and the BES 5 are normally in operation; all the resources (processes and memories that achieve the DB access servers) are used effectively.

When a trouble in power supply etc. occurs in an information processor 3200 to shut down DBMS 2 (unit 2) including the BES 1, the BES 2, and the BES 3, the other DBMS units in service (unit 1 and unit 3 in this example) take over the respective processes of the DBSs to continue the service. In other words, the failed BES 1 and BES 2 move to the operating unit 1. Similarly, the failed BES 3 moves to the operating unit 3.

Specifically, a system-monitor system-switch control mechanism 5 disposed on the same computer as that of the unit 1, and a system-monitor system-switchover control mechanism 5 disposed on the same computer as that of the unit 3 detect the occurrence of failure in the unit 2 and control the system switchover, to be described later, for the BES 1, the BES 2, and the BES 3. The system switchover for the BES 1 will be described by way of example.

The system-monitor system-switchover control mechanism 5 that has detected the failure of the BES 1 first determines a server destination (system-switchover destination unit) of the failed BES 1 from server-destination-in-failure information 30 (703). Here it is assumed that the destination is unit 1. In this case, a shared disk device 60 that holds a DB storage region 1 (61) to which the BES 1 has access is switched to allow access from an information processor in which the unit 1 is disposed (705). Then an instruction to switch the system is given to the DBMS 2 (unit 1) (706).

The DBMS 2 (unit 1) that has received the instruction from the system-monitor system-switchover control mechanism 5 first changes configuration information to add the BES1 to be changed to the unit 1 (802). Then the other units disposed in the other information processors are notified of the fact that the BES1 is added to the unit 1 (803). Then the BES1 to be changed is activated (started) (804). The database in the DB storage region 1 is restored following the activation process.

The above-described system switchover process in units of server has no influence on the process for the other BES (BES 4) that is operated in the destination unit in service. Also the other failed servers BES 2 and BES 3 are independently switched to the operating units (the unit 1 and the unit 3, respectively) for each server, as with the BES 1.

The FES 10 that has received the inquiry request 70 from the user (that is an application program) after the switchover analyzes the inquiry request and determines a database storage region having data to be accessed. A DB access server that has access to the determined database storage region sends a DB access request 80 to the units that are in operation at present (after the system has been changed).

The requested operating unit executes the received DB access with a designated server (BES 1) to access the DB storage region 1, executing a required data manipulation. In this embodiment, "12" in table data (62) stored in the DB storage region 1 (61) in a database 60 is sent to the FES 10 as an execution result. The sent table data is returned to the user as an inquiry result by the FES 10. In other words, the DB access request to the failed BES 1 can be achieved by exactly the same process as that for the BES 4 that is operated in the unit 1 before the occurrence of failure.

As can be seen from this embodiment, all the BES 1, BES 2, and BES 3 that have been operated in the failed unit 2 are not switched to one specified unit. Accordingly, the load after the occurrence of failure can be distributed, minimizing a decrease in the throughput of the entire system after the switchover by designating switchover destination. In this case, suppose that the transaction arrival ratio for destination units in service is a load. The load on the unit 1 amounts to 300%, and the load on the unit 3 amounts to 200% relative to that before switchover. The load is advantageously distributed even for one unit, as compared with 400% for the unit 1 or the unit 3 as a specified unit. It is desirable for the unit 1 and the unit 3 of this system to dispose and operate BESs equivalent to the unit 2 in the viewpoint of system design, in which case one BES is switched (shifted) in a state in which three BESs are in operation. Therefore, the transaction arrival ratio amounts to 133% relative to that before switchover.

The server-destination-in-failure information 30 is described on the assumption that it is registered in the DBMS by the user such as the administrator of the DBMS. The load on the administrator can be decreased when the DBMS automatically generates the server-destination-in-failure information 30 therein. In this case, the number of the BESs may be assigned equally to the units in the system. Of course, the server-destination-in-failure information 30 may be generated by a tool that uses the server-unit configuration information of the system as input to decrease the load on the administrator.

The server destination unit may be determined dynamically when failure occurs. In that case, a policy 90 for determining a server destination may be designated in advance by the administrator of the DBMS. The policy for determining a server destination includes the following:
(1) To select an operating unit with low loads such as a CPU usage rate, a transaction arrival ratio, and a disk access ratio as server destination.
(2) To select an operating unit with empty space in resources such as a memory as server destination.
(3) To assign server destination to multiple operating units so that the numbers of the BESs are equal.

Information on the load, the empty state of the resource, etc. described in (1), (2), and (3) is stored as operation information 100 in the DBMS and is referenced when the system is to be switched.

Since the multiple DB access servers (BESs) in the failed unit are distributed to multiple operating units server by server when failure occurs, as described above, a decrease in the throughput of the entire system after the switchover of the system at the occurrence of the failure can be minimized.

While the FES and the BES are disposed on different information processors in this embodiment, they may be disposed on the same computer, thus maximizing the utilization of hardware resources. Since the function of the FES and the function of the BES are implemented as one DB server in this embodiment, the administrator of the database management system does not need to manage the system in different ways, so that the cost of management can be decreased. The destination DB server of this embodiment may be on standby in the unit in a state in which it can be executed when the server-destination-in-failure information 30 is set.

Figure 2:
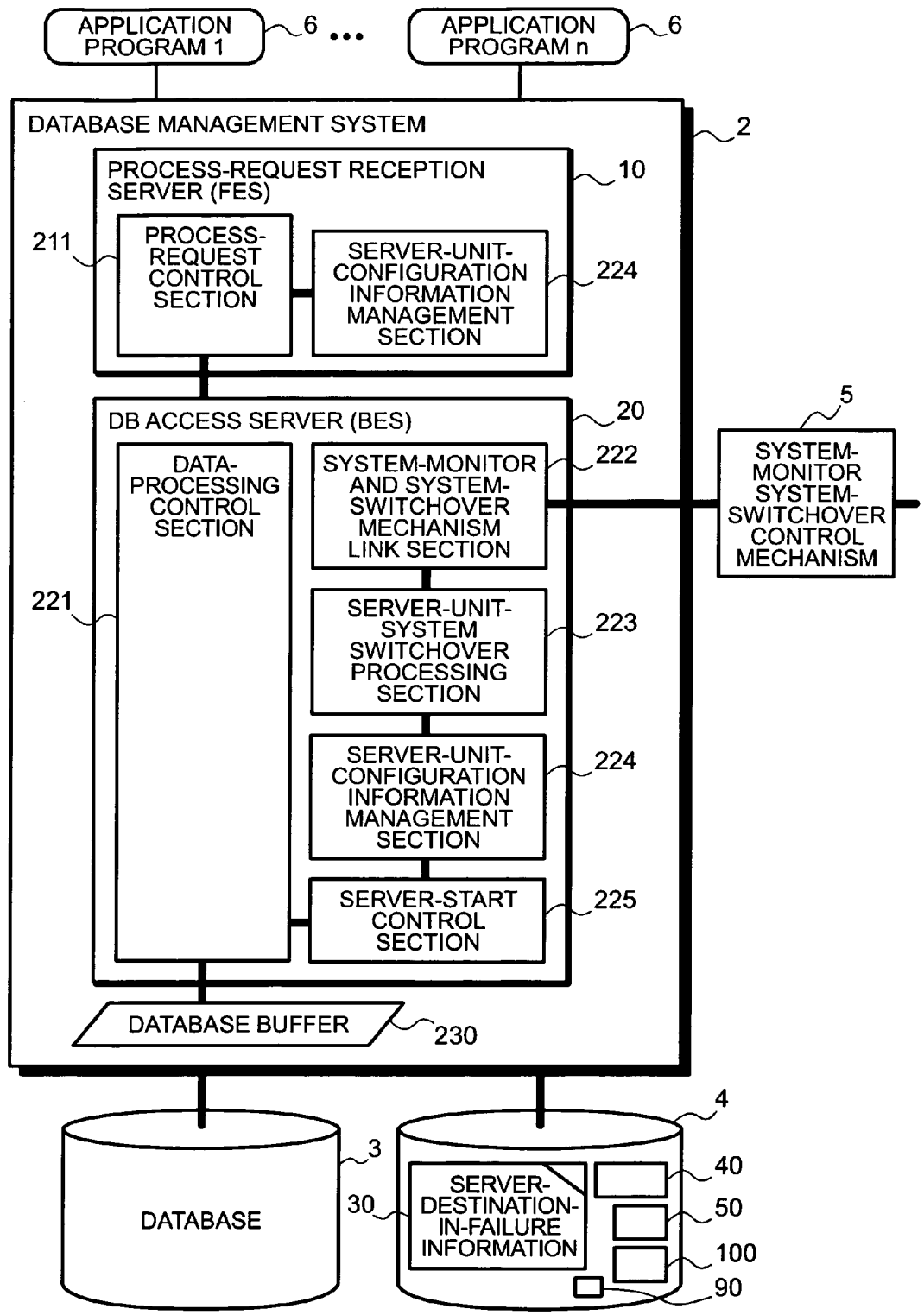
FIG. 2 is a functional block diagram of the database management system.

Referring to FIG. 2, the schematic structure of the database management system according to this embodiment will be described.

There are shown application programs 6 produced by a user and a database management system 2 that manages the entire database system such as inquiry processing and resource management. The database management system 2 includes the process-request reception server (FES) 10 and the DB access server (BES) 20. The database management system 2 also includes a database buffer 230, a database 3 for storing access data permanently or temporality, the server-destination-in-failure information 30, server-unit configuration information 40, server-DB storage region information 50, the system-switchover determination policy 90, and the operation information 100.

The process-request reception server (FES) 10 analyzes an inquiry sent from the application program 6, generates a DB access request, sends the DB access request to a DB access server, and returns the result of the DB access to the application program 6 as necessary. The DB access server (BES) 20 receives the DB access request from the process-request reception server 10 and accesses the database 3 stored in an external memory via the database buffer 230 in response to the request. In the DB access process by the DB access server to be changed, which is described with reference to FIG. 1, the same database buffer as that of the BES that is operated in the destination unit can be used. Briefly, the destination BES and the BES that has shifted to the destination can share a database buffer.

The database management system 2 connects to other systems via a network. The process-request reception server (FES) 10 and the DB access server (BES) 20 have not necessarily to be disposed on one computer. They may be disposed on different information processors and function as one database management system via a network. One database management system having multiple FESs can distribute much request loads from the user. Also, the system having multiple BESs can increase the parallelism of data processing, thus achieving high-speed data processing for a large-scale database. The unit of database management system equipped with FESs or BESs disposed on one information processor is hereinafter referred to as a unit or instance.

The process-request reception server 10 includes a process-request control section 211 that analyzes the syntax and semantics of an inquiry, determines a suitable procedure, generates a code corresponding to the procedure, and requests the DB access server 20 to access a database.

The DB access server 20 includes a data-processing control section 221 that controls access to the data on the database 3 in response to the DB access request (generated code) received from the process-request reception server 10.

The DB access server 20 further includes a system-monitor and system-switchover mechanism link section 222 that receives a system switchover request and activates a server-to-server system switchover process in conjunction with the system-monitor system-switchover control mechanism 5 when failure occurs in an information processor or a unit disposed in an information processor, a server-unit-system switchover processing section 223 that controls the system switchover process for a failed server in response to the request from the system-monitor and system-switchover mechanism link section 222, a server-unit-configuration information management section 224 that adds the server to be changed to the destination unit as part of the switchover process under the control of the server-unit-system switchover processing section 223, and a server-start control section 225 that activates a destination server and controls transaction restoration in which a DB storage region to which the server has access and so on is restored and the update result of a process in execution is cancelled. The server-unit-configuration information management section 224 is disposed also in the process-request reception server 10.

FIG. 3 is a diagram showing an example of a hardware configuration of a computer system according to the embodiment. The computer system of this embodiment includes information processors 3000, 3100, and 3200.

The information processor 3000 includes a CPU 3002, a main memory 3001, a communication controller 3003, an I/O controller 3004, and a terminal 3006. The main memory 3001 has an application program 3008 which is operated by the CPU 3002. When the application program 3008 makes an inquiry to the process-request reception server 10 of the DBMS 2, the communication controller 3003 of the information processor 3000 and the communication controller 3003 of the information processor 3100 send an inquiry request to the process-request reception server 10 via a network 3007.

The information processor 3100 includes the CPU 3002, the main memory 3001, the communication controller 3003, the I/O controller 3004, an external memory 3005 such as a magnetic disk unit, and the terminal 3006. The main memory 3001 of the information processor 3100 has the database management system 2 including the process-request reception server 10, which is described with reference to FIG. 2, and is operated by the CPU 3002. The external memory 3005 holds a database 3 which is managed by the database management system 2. The external memory 3005 also holds a program 3010 for achieving the database management system 2. The process-request reception server 10 reads/writes data from/to the external memory 3005 under the control of the I/O controller 3004 and transmits and receives data to/from the other information processors connected via the network 3007 under the control of the communication controller 3003.

The information processor 3200 includes the CPU 3002, the main memory 3001, the communication controller 3003, the I/O controller 3004, the external memory 3005 such as a magnetic disk unit, and the terminal 3006. The main memory 3001 of the information processor 3200 has the database management system 2 including the DB access server 20, which is described with reference to FIG. 2, and is operated by the CPU 3002. The external memory 3005 holds the database 3 which is managed by the database management system 2. The external memory 3005 also holds the program 3010 for achieving the database management system 2. The DB access server 20 reads/writes data from/to the external memory 3005 under the control of the I/O controller 3004 and transmits and receives data to/from the other information processors connected via the network 3007 under the control of the communication controller 3003.

The external memories 3005 that hold the respective databases 3 associated with the two information processors 3200 are shared disks and so can be accessed from the other information processors. The access to the shared disks is controlled by the system-monitor system-switchover control mechanism 5 (also referred to as a cluster ware) that monitors the operating condition of the database management system 2 (monitors the system) and controls the system switchover operation associated with the occurrence of various failures.

FIG. 4 is a diagram showing an example of information on server-database storage region according to the embodiment.

In the example of FIG. 4, server-database storage region information 50 includes a DB storage region name 401 indicative of a DB storage region and the name 402 of a database access server that has access to the DB storage region identified by the DB storage region name 401. An information entry 411 indicates that a BES 1 has access to a DB storage region 1. Similarly, an information entry 412 indicates that a BES 2 has access to a DB storage region 2, and an information entry 413 indicates that a BES 3 has access to a DB storage region 3. The information is statistic system-configuration information that is not changed by system switchover.

FIG. 5 is a diagram showing an example of information on server destination when failure occurs according to the embodiment.

In the example of FIG. 5, the server-destination-in-failure information 30 includes a DB access server name 501 and the name 502 of a unit that becomes switchover destination when failure occurs in a server identified by the DB access server name 501. An information entry 511 indicates that a BES 1 is switched to a unit 1 when failure occurs, or the BES 1 disposed in the unit 1 takes over the process to continue the service. Similarly, an information entry 512 indicates that a BES 2 is switched to the unit 1 when failure occurs, and an information entry 513 indicates that a BES 3 is switched to the unit 3 when failure occurs. The information can be designated by a DBMS administrator in advance at the start of the system, or alternatively, can be generated automatically by the system. In that case, the policy 90 for determining a server destination may be designated by the user. The policy 90 includes the following:

(1) To switch all DB access servers included in a given unit to different units.
(2) To switch the DB access servers equally to multiple specified units.

The server-destination-in-failure information 30 is often disposed in the memory of an information processor in which the DBMS is operated so as to be accessed easily from the DBMS. Furthermore, in this embodiment, the BES 1, the BES 2, and the BES 3 each have one information entry. However, they may each have multiple entries, in other words, multiple switchover destination units. Accordingly, switchover destination can be determined from the unit operation information at the occurrence of failure and the priority of the multiple switchover destination units.

FIG. 6 is a diagram showing an example of information on server-unit configuration according to the embodiment. The upper numerals 611 to 615 indicate information before the unit 2 fails. The lower numerals 621 to 625 indicate information after the unit 2 fails, so that system switchover has been executed.

In the example of FIG. 6, the server-unit configuration information 40 includes a DB access server name 601 and the name 602 of a unit in which the DB access server is disposed. The configuration of the BES 1, the BES 2, and the BES 3, which are normally disposed in the unit 2, is changed by system switchover associated with the failure of the unit 2 such that the BES 1 and the BES 2 are shifted to the unit 1, and the BES 3 is shifted to the unit 3, as shown in the information entries 611 and 621, the information entries 612 and 622, and the information entries 613 and 623.

Figure 7:
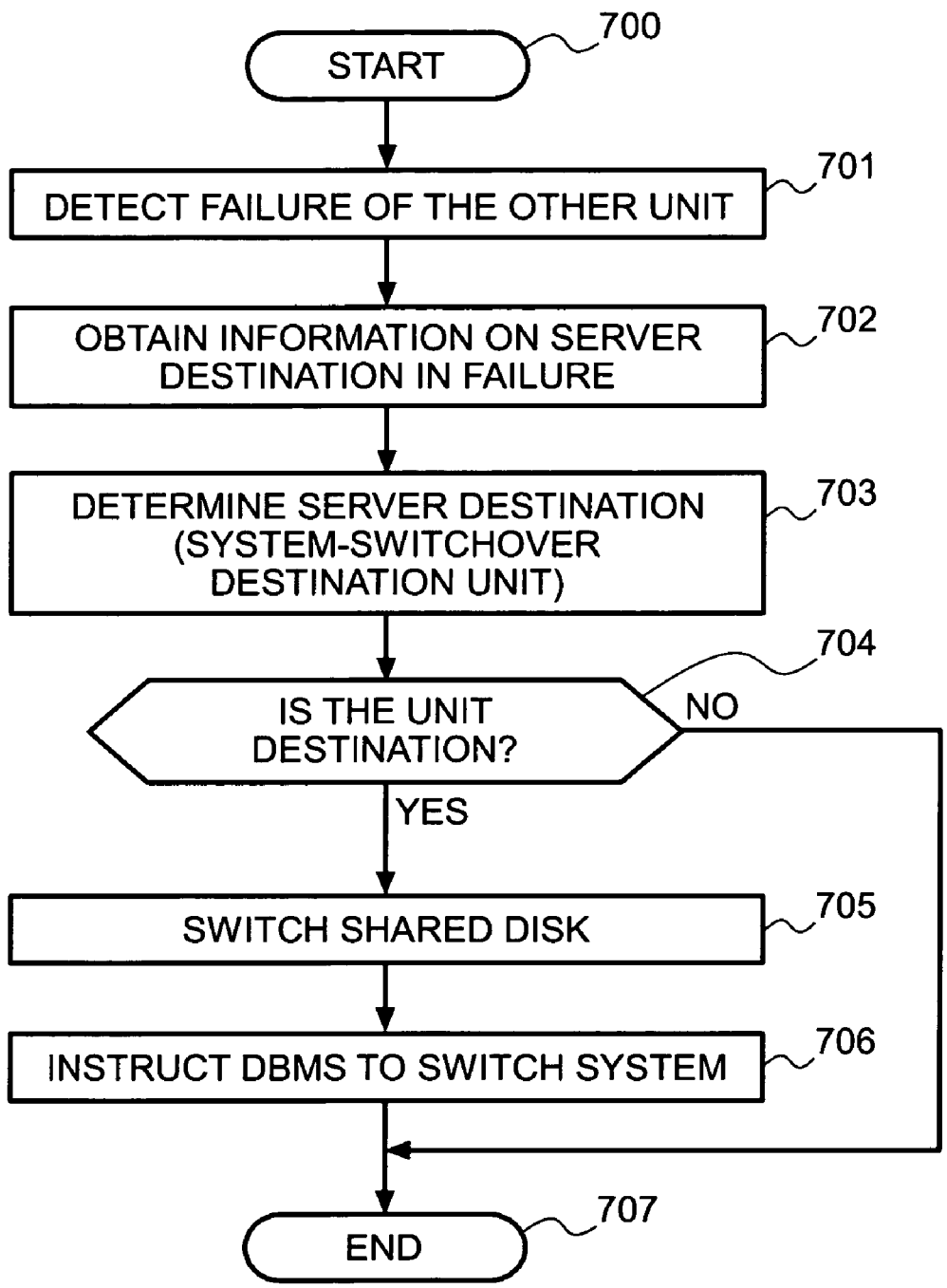
FIG. 7 is a flowchart for the procedure of system switchover process when failure occurs in a system-monitor and system-switchover control mechanism.
Figure 8:
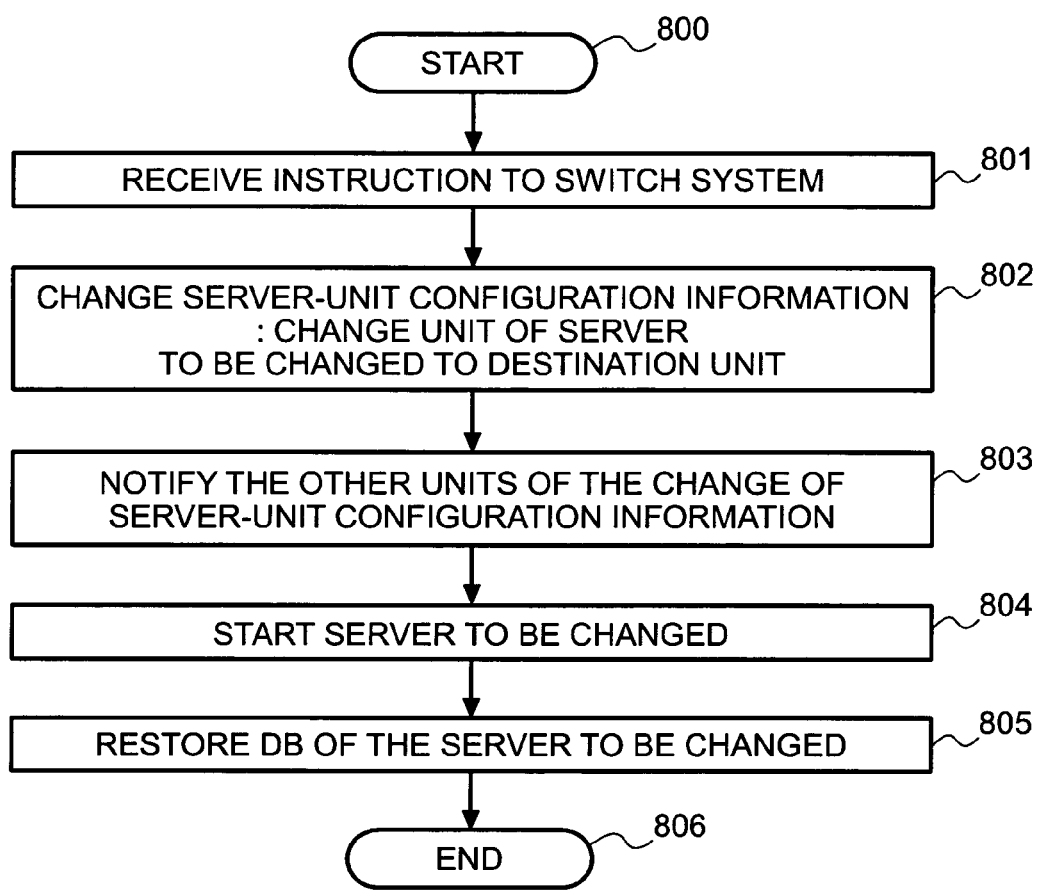
FIG. 8 is a flowchart for the procedure of system switchover process when failure occurs in a switchover destination unit.

FIGS. 7 and 8 are flowcharts for the procedure of system switchover processing at the occurrence of failure in the system-monitor and system-switchover control mechanism and the switchover destination unit of this embodiment. FIG. 7 shows the procedure of the system-monitor and system-switchover control mechanism. FIG. 8 shows the procedure of the switchover destination unit.

The system-monitor system-switchover control mechanism 5 detects the occurrence of the failure of a unit in step 701, and obtains information on server destination in the event of failure in step 702. The mechanism 5 then determines a server destination, or a system switchover destination unit, according to the obtained server-destination-in-failure information (step 703). When a given unit is determined to be destination (step 704), the procedure moves to step 705, where the shared disk is switched. In step 706, a failed server (a server to be changed) is designated to the DBMS, and the DBMS is instructed to change the system. On the other hand, in step 704, a given unit is not determined to be destination, the procedure moves to step 707, where the procedure is terminated.

The unit (DBMS 2), which has received an instruction to switch the system from the system-monitor system-switchover control mechanism 5 in step 801, changes server-unit configuration information in step 802. Specifically, the DBMS 2 changes the designated server to be changed to the destination unit because the designated server moves to the destination unit by system switchover. Subsequently, in step 803, the other units disposed in the other information processors are notified of the fact that the server to be changed is added to the destination unit. In step 804, the server to be changed is activated (started). In step 805, the DBMS 2 executes a DB restoration process for the DB storage region to which the server to be changed has access, and a transaction restoration process of canceling the update result of the process that was executed at the occurrence of failure.

Figure 9:
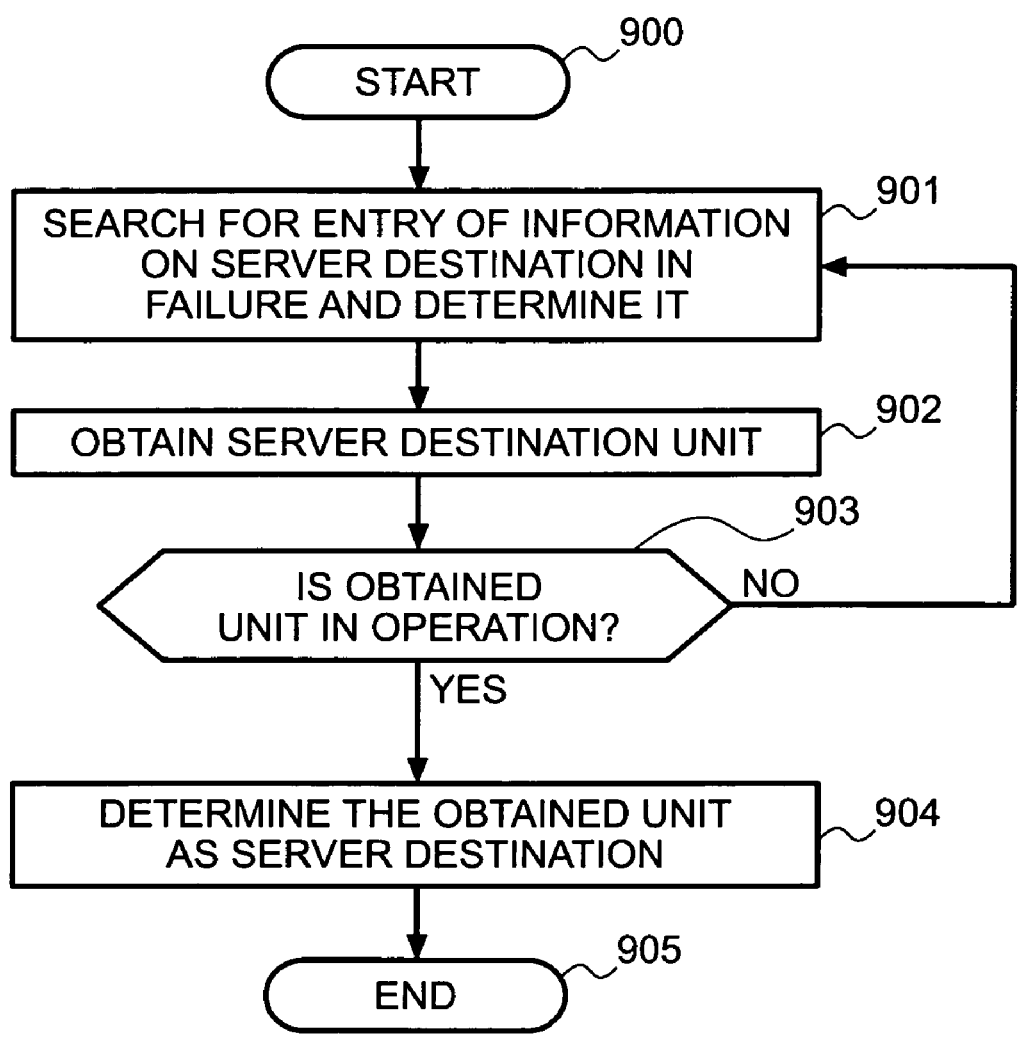
FIG. 9 is a flowchart for the procedure of determining a server destination unit in system switchover processing in the event of failure.

FIG. 9 is a flowchart for the procedure of determining a server destination unit in system switchover processing in the event of failure according to the embodiment.

In step 901, the information entry of the server destination in failure is searched for and an information entry associated with the failed server is determined. In step 902, the name of a server destination unit is obtained from the determined information entry. In step 903, it is determined whether the obtained unit is at present in operation and so is available. When the obtained unit is out of operation, the procedure returns to step 901, where it searches for another destination unit; when the obtained unit is in operation, the procedure moves to step 904, where it determines the obtained unit to be server destination.

Figure 10:
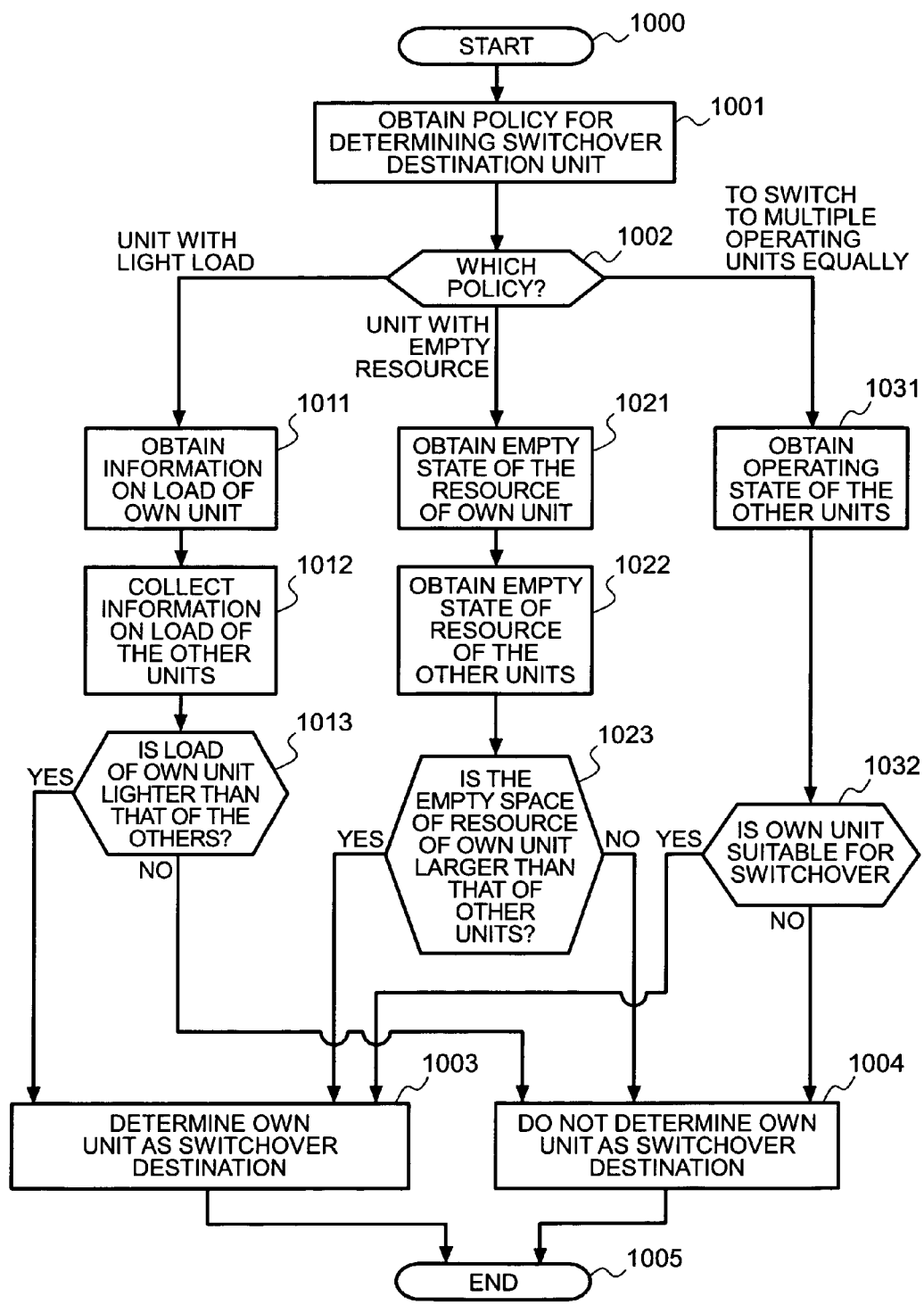
FIG. 10 is a flowchart for the procedure of determining a server destination unit in system switchover processing in the event of failure, according to another embodiment.

FIG. 10 is a flowchart for the procedure of determining a server destination unit in system switchover processing in the event of failure, according to another embodiment. Here is shown a procedure for dynamically determining a server destination unit when failure occurs. The policy 90 for determining the server destination is designated in advance by the administrator of the DBMS and so on. The designated information is held in the DBMS.

In step 1001, a policy for determining a destination is obtained. In step 1002, a determination is made for the obtained policy and a destination is decided from the determination. In this example, three policies are indicated.

When the policy is determined in step 1002 to be "a unit with a light load," the procedure moves to step 1011, wherein information on load of own unit is obtained. Examples of the load information include the utilization factor of the CPU, a transaction arrival ratio, and a disk access ratio. In step 1012, information on the load of the other operating units is also collected. In step 1013, the loads of own unit and the other units are compared, wherein when the load of the own unit is lower than that of the other units, the process moves to step 1003, wherein the own unit is determined to be a switchover destination; when the load of the own unit is higher than that of the other units, the process moves to step 1004, where the own unit is not determined to be the determination.

When the policy is determined in step 1002 to be "a unit with an empty resource," the procedure moves to step 1021, wherein the empty state of the resource of the own unit (control blocks for managing information on memories servers) is obtained. In step 1022, the empty state of the resource of the other units is also obtained. In step 1023, the empty states of the resources of the own unit and the other units are compared. When it is determined in step 1023 that the resource of the own unit is larger than that of the other units, the procedure moves to step 1003, wherein the own unit is determined to be a destination; when it is determined in step 1013 that the resource of the own unit is smaller than that of the other units, the procedure moves to step 1004, wherein the own unit is not determined to be the destination.

When the policy is determined in step 1002 to "switch to multiple operating units equally," the procedure moves to step 1031, wherein the operation information on the other units is obtained. In step 1031, it is determined from the number of the obtained operating units whether the own unit is suitable for a determination. When it is not particularly unsuitable for destination, the procedure moves to step 1003, wherein the own unit is determined to be the destination; when it is determined from the number of the other operating units and the servers to be changed that the own unit is not suitable for the destination, the procedure moves to step 1004, wherein the own unit is not determined to be the destination.

Figure 11:
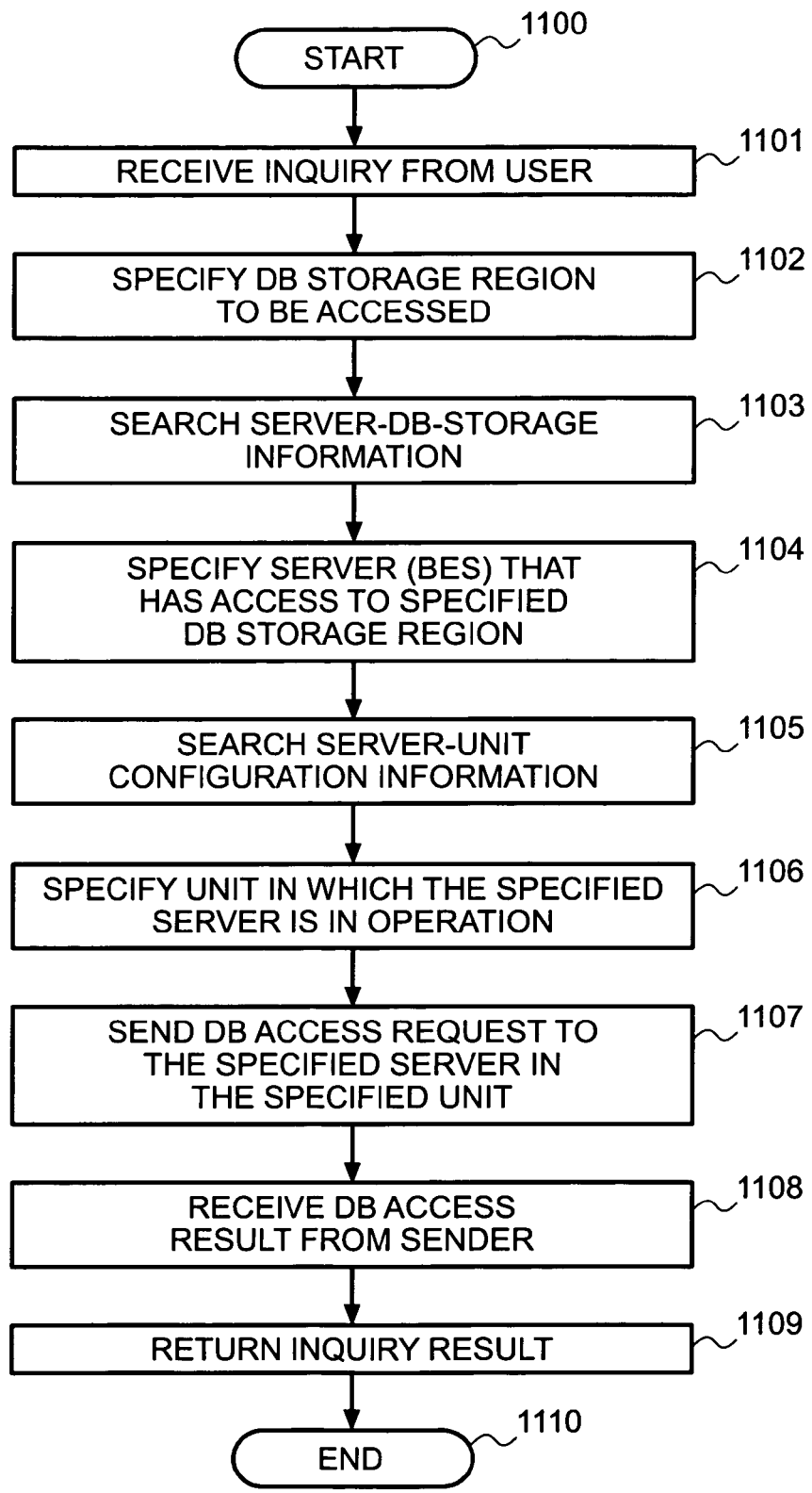
FIG. 11 is a flowchart for the procedure of user inquiry after system switchover processing in failure, in a process request controller.

FIG. 11 is a flowchart for the procedure of user inquiry after system switchover processing in failure by a process request controller according to the embodiment.

In step 1101, an inquiry from the user is received and analyzed. In step 1102, a DB storage region to be accessed to achieve the user inquiry is specified. In step 1103, server-DB-storage region information is searched to specify a server (BES) that has access to the specified DB storage region (step 1104). In step 1105, server-unit configuration information is searched to specify a unit in which the specified server (BES) is in operation (step 1106). In step 1107, a DB access request is sent to the server specified before the unit is specified. In step 1108, the result of DB access is received from the sender. In step 1109, the inquiry result is returned.

The process of the flowcharts shown in FIGS. 7, 8, 9, 10, and 11 is executed as the program of the computer system shown in FIG. 3. The program is not necessarily stored in the external memories that are directly physically connected to the computer system as is the example of FIG. 3. The program can be stored in storage media that can be read and written by computers, such as a hard disk drive and a flexible disk drive. The program can also be stored via a network in external memories that are connected to another information processor different from the information processors of the computer system in FIG. 3.

This allows a database management system that uses a shared-nothing architecture to minimize a decrease in the throughput of the entire system even after the system switchover at the occurrence of failure without standby-only resources (machines and DBMS instances) prepared for the failure, thus allowing stable performance to be maintained.

What is claimed is:

1. A method for database processing in a database management system including a plurality of database processors each having a database processing program, the system holding a database divided into multiple storage regions and processing the database by executing the database processing program assigned to the corresponding storage region, the method comprising the steps of:

determining a destination database processor from the database processors in service when failure of a database processor is detected;

assigning the storage region assigned to the failed database processor by the destination database processor to a database processing program that operates in the destination database processor; and starting the database processing program in the destination database processor, wherein the step of determining a destination database processor when failure of a database processor is detected comprises:

referring to switchover-destination-in-failure information including the name of the failed database processor and the name of a database processor that is to be the destination database processor when failure occurs, obtaining a name of a database processor that is included in the switchover-destination-in-failure information and is associated with the failed database processor, and determining the database processor indicated by the obtained names of the database processor to be the destination database processor.

2. The method for database processing according to claim 1, wherein the switchover-destination-in-failure information is generated in advance on instruction from a user.

3. The method for database processing according to claim 2, wherein the policy is generated to switch all the plurality of database processing programs contained in the specified database processor to different units, or to switch the database processing programs equally in number to specified database processors.

4. The method for database processing according to claim 1, wherein the switchover-destination-in-failure information is generated by the database management system in advance according to a policy given from a user.

5. A method for database processing in a database management system including a plurality of database processors each having a database processing program, the system holding a database divided into multiple storage regions and processing the database by executing the database processing program assigned to the corresponding storage region, the method comprising the steps of:

determining a destination database processor from the database processors in service when failure of a database processor is detected;

assigning the storage region assigned to the failed database processor by the destination database processor to a database processing program that operates in the destination database processor; and starting the database processing program in the destination database processor, wherein when failure of a database processor is detected, the step of determining a destination database processor of the failed database processor comprises:

referring to a policy given from a user in advance, when a reference result is a database processor with a light load, comparing the load of a database processor with the loads of the other database processors, wherein when the load of the database processor is lighter, determining the database processor to be the destination, when the reference result is a database processor with an empty resource, comparing the space of the resources including a memory of the database processor and a control block disposed on the memory with the space of the resources of the other database processors, wherein when the space of the resources the database processor is larger, determining the database processor to be the destination, and when the reference result is to switch the DB access servers equally to multiple specified database processor in service, obtaining an operating state of the other database processors and determining the database processor to be the destination from the number of the operating database processors.

6. A program, stored on a storage medium, for database processing in a database management system including a plurality of database processors each having a database processing program, the system holding a database divided into multiple storage regions and processing the database by executing the database processing program assigned to the corresponding storage region, the program, when executed, causes the database management system to perform the steps of:

determining a destination database processor from the database processors in service when failure of a database processor is detected;

assigning the storage region assigned to the failed database processor by the destination database processor to a database processing program that operates in the destination database processor; and starting the database processing program in the destination database processor, wherein the step of determining a destination database processor when failure of a database processor is detected comprises:

referring to switchover-destination-in-failure information including the name of the failed database processor and the name of a database processor that is to be the destination database processor when failure occurs, obtaining a name of a database processor that is included in the switchover-destination-in-failure information and is associated with the failed database processor, and determining the database processor indicated by the obtained names of the database processor to be the destination database processor.

7. The program according to claim 6, wherein the switchover-destination-in-failure information is generated in advance on instruction from a user.

8. The program according to claim 7, wherein the policy is generated to switch all the plurality of database processing programs contained in the specified database processor to different units, or to switch the database processing programs equally in number to specified database processors.

9. The program according to claim 6, wherein the switchover-destination-in-failure information is generated by the database management system in advance according to a policy given from a user.

10. A program, stored on a storage medium, for database processing in a database management system including a plurality of database processors each having a database processing program, the system holding a database divided into multiple storage regions and processing the database by executing the database processing program assigned to the corresponding storage region, the program, when executed causes the database management system to perform the steps of:

determining a destination database processor from the database processors in service when failure of a database processor is detected;

assigning the storage region assigned to the failed database processor by the destination database processor to a database processing program that operates in the destination database processor; and starting the database processing program in the destination database processor, wherein when failure of a database processor is detected, the step of determining a destination database processor of the failed database processor comprises:

referring to a policy given from a user in advance, when a reference result is a database processor with a light load, comparing the load of a database processor with the loads of the other database processors, wherein when the load of the database processor is lighter, determining the database processor to be the destination, when the reference result is a database processor with an empty resource, comparing the space of the resources including a memory of the database processor and a control block disposed on the memory with the space of the resources of the other database processors, wherein when the space of the resources the database processor is larger, determining the database processor to be the destination, and when the reference result is to switch the DB access servers equally to multiple specified database processor in service, obtaining an operating state of the other database processors and determining the database processor to be the destination from the number of the operating database processors.

11. A database management system for database processing comprising:
a plurality of database processors each having a database processing program; and
a database divided into multiple storage regions,
wherein the database is processed by executing the database processing program assigned to the corresponding storage region,
wherein said database management system determines a destination database processor from the database processors in service when failure of a database processor is detected, assigns the storage region assigned to the failed database processor by the destination database processor to a database processing program that operates in the destination database processor, and starts the database processing program in the destination database processor,
wherein the processing of determining a destination database processor when failure of a database processor is detected comprises:
referring to switchover-destination-in-failure information including the name of the failed database processor and the name of a database processor that is to be the destination database processor when failure occurs,
obtaining a name of a database processor that is included in the switchover-destination-in-failure information and is associated with the failed database processor, and
determining the database processor indicated by the obtained names of the database processor to be the destination database processor.

12. The database management system according to claim 11, wherein the switchover-destination-in-failure information is generated in advance on instruction from a user.

13. The database management system according to claim 12, wherein the policy is generated to switch all the plurality of database processing programs contained in the specified database processor to different units, or to switch the database processing programs equally in number to specified database processors.

14. The database management system according to claim 11, wherein the switchover-destination-in-failure information is generated by the database management system in advance according to a policy given from a user.

15. A database management system for database processing comprising:
a plurality of database processors each having a database processing program; and
a database divided into multiple storage regions,
wherein the database is processed by executing the database processing program assigned to the corresponding storage region,
wherein said database management system determines a destination database processor from the database processors in service when failure of a database processor is detected, assigns the storage region assigned to the failed database processor by the destination database processor to a database processing program that operates in the destination database processor, and starts the database processing program in the destination database processor,
wherein when failure of a database processor is detected, the processing of determining a destination database processor of the failed database processor comprises:
referring to a policy given from a user in advance,
when a reference result is a database processor with a light load, comparing the load of a database processor with the loads of the other database processors, wherein when the load of the database processor is lighter, determining the database processor to be the destination,
when the reference result is a database processor with an empty resource, comparing the space of the resources including a memory of the database processor and a control block disposed on the memory with the space of the resources of the other database processors, wherein when the space of the resources the database processor is larger, determining the database processor to be the destination, and
when the reference result is to switch the DB access servers equally to multiple specified database processor in service, obtaining an operating state of the other database processors and determining the database processor to be the destination from the number of the operating database processors.

* * * * *